us009017876B2

(12) United States Patent
Sueki et al.

(10) Patent No.: US 9,017,876 B2
(45) Date of Patent: *Apr. 28, 2015

(54) POSITIVE ELECTRODE ACTIVE MATERIAL, PRODUCTION METHOD THEREOF AND ITS USE

(75) Inventors: Toshitsugu Sueki, Osaka (JP); Motoaki Nishijima, Osaka (JP); Koji Ohira, Osaka (JP); Shogo Esaki, Osaka (JP); Isao Tanaka, Kyoto (JP); Yukinori Koyama, Kyoto (JP); Katsuhisa Tanaka, Kyoto (JP); Koji Fujita, Kyoto (JP); Shunsuke Murai, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 281 days.

This patent is subject to a terminal disclaimer.

(21) Appl. No.: 13/275,858

(22) Filed: Oct. 18, 2011

(65) Prior Publication Data

US 2012/0100429 A1 Apr. 26, 2012

(30) Foreign Application Priority Data

Oct. 19, 2010 (JP) ................................. 2010-234814

(51) Int. Cl.
*H01M 4/1391* (2010.01)
*H01M 4/58* (2010.01)
(Continued)

(52) U.S. Cl.
CPC ............. *H01M 4/5825* (2013.01); *C01B 25/45* (2013.01); *H01M 4/131* (2013.01); *H01M 4/136* (2013.01);
(Continued)

(58) Field of Classification Search
USPC ............. 429/213, 221, 323, 322, 321, 231.95
See application file for complete search history.

(56) References Cited

U.S. PATENT DOCUMENTS 6,085,015 A * 7/2000 Armand et al. ............... 385/140
2002/0045098 A1 * 4/2002 Tabuchi et al. ............... 429/221
(Continued)

FOREIGN PATENT DOCUMENTS

CA 2 358 281 A1 4/2002
CA 2 550 496 A1 7/2005
(Continued)

OTHER PUBLICATIONS

Julien et al. Nanoscopic scale studies of LiFePO4 as cathode material in lithium-ion batteries for HEV application (Ionics (2007) 13:395-411).*
(Continued)

*Primary Examiner* — Stewart Fraser
*Assistant Examiner* — Olatunji Godo
(74) *Attorney, Agent, or Firm* — Nixon & Vanderhye P.C.

(57) ABSTRACT

A method of producing a positive electrode active material, comprising the steps of:
preparing a solution by dissolving, in a solvent, respective predetermined amounts of a lithium source, a M source, a phosphorus source and a X source necessary for forming a positive electrode active material represented by the following general formula (1) having an olivine structure;
gelating the obtained solution by addition of a cyclic ether; and
calcinating the generated gel to obtain a carbon-coated lithium-containing composite oxide,
wherein the positive electrode active material is represented by the general formula (1):

$$Li_xM_yP_{1-z}X_zO_4 \qquad (1)$$

wherein M is at least one element selected from the group consisting of Fe, Ni, Mn, Zr, Sn, Al and Y, X is at least one selected from the group consisting of Si and Al, and $0<x\le2$, $0.8\le y\le1.2$, $0\le z\le1$.

10 Claims, 8 Drawing Sheets (51) Int. Cl.
    *C01B 25/45*     (2006.01)
    *H01M 4/485*     (2010.01)
    *H01M 4/505*     (2010.01)
    *H01M 4/525*     (2010.01)
    *C01B 31/02*     (2006.01)
    *H01M 4/131*     (2010.01)
    *H01M 4/136*     (2010.01)
    *H01M 4/62*     (2006.01)
    *H01M 10/052*     (2010.01)
    *H01M 4/02*     (2006.01)

(52) U.S. Cl.
CPC .............. *H01M 4/485* (2013.01); *H01M 4/505* (2013.01); *H01M 4/525* (2013.01); *H01M 4/622* (2013.01); *H01M 4/623* (2013.01); *H01M 10/052* (2013.01); *H01M 2004/021* (2013.01); *C01B 31/02* (2013.01); *Y02E 60/122* (2013.01)

(56) References Cited

U.S. PATENT DOCUMENTS

| | | | |
|---|---|---|---|
| 2003/0129496 | A1 | 7/2003 | Kasai et al. |
| 2003/0170542 | A1 | 9/2003 | Barker et al. |
| 2005/0112054 | A1* | 5/2005 | Eberman et al. ........... 423/594.4 |
| 2007/0212606 | A1 | 9/2007 | Chang |
| 2008/0138709 | A1* | 6/2008 | Hatta et al. .................... 429/221 |
| 2010/0102270 | A1 | 4/2010 | Jia et al. |
| 2010/0140540 | A1* | 6/2010 | Yamada et al. ............ 252/182.1 |
| 2010/0323231 | A1* | 12/2010 | Sakai et al. ................... 429/144 |
| 2012/0070708 | A1 | 3/2012 | Ohira et al. |
| 2012/0100429 | A1 | 4/2012 | Sueki et al. |
| 2012/0264016 | A1* | 10/2012 | Sueki et al. .................. 429/213 |
| 2013/0075673 | A1* | 3/2013 | Nishijima et al. ....... 252/519.14 |

FOREIGN PATENT DOCUMENTS

| | | |
|---|---|---|
| CA | 2 769 207 A1 | 2/2011 |
| CN | 101219360 | 7/2008 |
| CN | 101339994 | 1/2009 |
| JP | 2002-198050 | 7/2002 |
| JP | 2004-014341 | 1/2004 |
| JP | 2005-519451 | 6/2005 |
| JP | 2008-311067 | 12/2008 |
| JP | 2009-004371 | 1/2009 |
| JP | 2012-079554 | 4/2012 |
| JP | 2012-089342 | 5/2012 |
| WO | WO 02/27823 A1 | 4/2002 |
| WO | WO 2009/096335 * | 8/2009 |
| WO | 2009/124431 A1 | 10/2009 |
| WO | 2010/046629 A1 | 4/2010 |
| WO | WO 2010/134579 | 11/2010 |

OTHER PUBLICATIONS

International Search Report for PCT/JP2011/062599 dated Aug. 30, 2011.

Gaberseck et al., "Mass and Charge Transport in Hierarchically Organized Storage Materials," Example: Porous Active Materials with Nanocoated Walls of Pores, Solid State Iconics, vol. 77, No. 35-36, 2006, pp. 3015-3022.

Wang et al., "A Sudy of LiFePO$_4$ and its Doped Derivatives as Cathode Materials for Lithium-Ion Batters," Journal of Power Sources, 2006, vol. 159, No. 1, pp. 282-286.

Office Action issued in U.S. Appl. No. 13/416,169 dated Sep. 12, 2013.

Deng et al, "Effect of Mn Substitution on the Structural, Morphological and Electrochemical Behaviors of Li$_2$Fe$_{1-x}$Mn$_x$SiO$_4$ Synthesized via Critic Acid Assisted sol-gel Method", Journal of Alloys and Compounds, 487 (2009) L18-L 23.

Office Action mailed Nov. 7, 2013 in U.S. Appl. No. 13/701,273.

C. Deng et al.; Characterization of Li2MnSiO4 and Li2FeSiO4 Cathode Materials Synthesized via a Citric Assisted Sol-Gel Method, Materials Chemistry and Physics, vol. 120, Issue 1, Mar. 15, 2010, pp. 14-17.

* cited by examiner

POSITIVE ELECTRODE ACTIVE MATERIAL, PRODUCTION METHOD THEREOF AND ITS USE

CROSS-REFERENCE TO RELATED APPLICATION

This application is related to Japanese application No. 2010-234814 filed on Oct. 19, 2010, whose priority is claimed under 35 USC §119, the disclosure of which is incorporated by reference in its entirety.

BACKGROUND OF THE INVENTION

1. Field of the Invention

The present invention relates to a positive electrode active material and a method of producing the same, a positive electrode, and a non-aqueous electrolyte secondary battery. More specifically, the present invention relates to a positive electrode active material providing a non-aqueous electrolyte secondary battery having an excellent cycle characteristic, a method of producing the same, and a positive electrode and a non-aqueous electrolyte secondary battery using the same.

2. Description of the Related Art

As a non-aqueous electrolyte secondary battery, a lithium secondary battery has been put into practical use, and has been widely used. Furthermore, in recent years, a lithium secondary battery attracts attention as a large-capacity device for automobile use or electric power storage, as well as a small-size one for use in a portable electronic device. Therefore, higher requirements of safety, cost, service life and the like have been imposed.

A lithium secondary battery mainly consists of a positive electrode, an negative electrode, an electrolytic solution, a separator and an exterior material. The aforementioned positive electrode consists of a positive electrode active material, a conductive material, a collector and a binder (binding agent).

Generally, as a positive electrode active material, a layered transition metal oxide represented by lithium cobaltate ($LiCoO_2$) is used. However, a layered transition metal oxide is susceptible to oxygen desorption at a relatively low temperature around 150° C. in a fully charged state, and a thermal runaway reaction of the battery can occur due to the oxygen desorption. Therefore, in using a battery having such a positive electrode active material in a portable electronic device, accidents such as heat generation and ignition of the battery can occur.

For this reason, a lithium-containing composite oxide having a stable structure, not emitting oxygen in an abnormal condition, and having an olivine structure that is safer than $LiCoO_2$, for example, lithium iron phosphate ($LiFePO_4$) is expected. Lithium iron phosphate has a merit that it is relatively low in cost because it does not contain cobalt exhibiting low crustal abundance. Lithium iron phosphate also has a merit that it has more stable structure than a layered transition metal oxide.

However, when lithium iron phosphate is used as a positive electrode active material, there arise the problems that decrease in discharge capacity due to repeated charging/discharging is large, and a service life of a battery obtained therefrom is short. This is because since expansion or contraction of a positive electrode active material caused by insertion or desorption of $Li^+$ due to charging/discharging is large, the positive electrode active material gradually drops off physically from the collector or the conductive material due to increased number of cycles, and the structure of the positive electrode active material is broken, and the active material not contributing to charging/discharging increases to cause drop of the discharge capacity. For addressing to this problem, there has been proposed a method of preventing expansion or contraction of a positive electrode active material by using, as a positive electrode active material, a lithium-containing composite oxide obtained by subjecting a basic structure of lithium iron phosphate obtained by a solid-phase method to element substitution (for example, Japanese Unexamined Patent Publication No. 2002-198050 and Japanese Translation of PCT International Application Publication No. 2005-519451).

SUMMARY OF THE INVENTION

According to the present invention, there is provided a method of producing a positive electrode active material, comprising the steps of:

preparing a solution by dissolving, in a solvent, respective predetermined amounts of a lithium source, a M source, a phosphorus source and a X source necessary for forming a positive electrode active material represented by the following general formula (1) and having an olivine structure;

gelating the obtained solution by addition of a cyclic ether; and calcinating the generated gel to obtain a carbon-coated lithium-containing composite oxide, wherein the positive electrode active material is represented by the general formula (1):

$$Li_xM_yP_{1-z}X_zO_4 \qquad (1)$$

wherein M is at least one element selected from the group consisting of Fe, Ni, Mn, Zr, Sn, Al and Y, X is at least one selected from the group consisting of Si and Al, and $0<x\le2$, $0.8\le y\le1.2$, $0\le z\le1$.

According to the present invention, it provides a positive electrode active material obtained by the foregoing production method.

Further, the present invention provides a positive electrode including the positive electrode active material obtained by the foregoing production method, a conductive material, and a binder.

Also, the present invention provides a non-aqueous electrolyte secondary battery having a positive electrode including a positive electrode active material obtained by the foregoing production method, an negative electrode, an electrolyte and a separator.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

When the positive electrode active material is carried out using a solid-phase method as described in Japanese Unexamined Patent Publication No. 2002-198050 and Japanese Translation of PCT International Application Publication No. 2005-519451, there arises the problem that impurities generate, and a lithium-containing composite oxide having a single-phase olivine structure is difficult to be produced. Further, in the solid-phase method, since the lithium-containing composite oxide obtained by calcinating is in an aggregated state, it is necessary to control the particle size by grinding, however, there is also a problem that the grinding will deteriorate the crystallinity of the lithium-containing composite oxide and lead to decrease in capacity.

Accordingly, there is a need for a method capable of producing a lithium-containing composite oxide having a single-phase olivine structure, and controlling the particle size without leading to decrease in crystallinity of the lithium-containing composite oxide.

In light of the above, it is an object of the present invention to provide a method of producing a lithium-containing composite oxide capable of producing a lithium-containing composite oxide having a single-phase olivine structure, and controlling the particle size without leading to decrease in crystallinity of the lithium-containing composite oxide.

In the course of diligently examining a lithium-containing composite oxide having an olivine structure, the inventors of the present invention found that a service life of a battery is improved when a lithium-containing composite oxide wherein part of iron element and phosphorus element of LiFePO$_4$ is substituted with another element is used as a positive electrode active material.

(1) Lithium-Containing Composite Oxide (Positive Electrode Active Material)

In the production method of a positive electrode active material of the present invention, a lithium-containing composite oxide having an olivine structure and represented by the following general formula (1):

$$Li_xM_yP_{1-z}X_zO_4 \quad (1)$$

wherein M is at least one element selected from the group consisting of Fe, Ni, Mn, Zr, Sn, Al and Y, X is at least one selected from the group consisting of Si and Al, and $0 < x \le 2$, $0.8 \le y \le 1.2$, $0 \le z \le 1$,
is obtained.

Specific examples of the lithium-containing composite oxides include:
$Li_xFe_yP_{1-z}O_4$
($0.8 \le x \le 1.2$, $0.8 \le y \le 1.2$, $z=0$),
$Li_xNi_yP_{1-z}O_4$
($0.8 \le x \le 1.2$, $0.8 \le y \le 1.2$, $z=0$),
$Li_xMn_yP_{1-z}O_4$
($0.8 \le x \le 1.2$, $0.8 \le y \le 1.2$, $z=0$),
$Li_x(Fe,Ni)_yP_{1-z}O_4$
($0.8 \le x \le 1.2$, $0.8 \le y \le 1.2$, $z=0$),
$Li_x(Fe,Mn)_yP_{1-z}O_4$
($0.8 \le x \le 1.2$, $0.8 \le y \le 1.2$, $z=0$),
$Li_x(Fe,Zr)_yP_{1-z}O_4$
($0.8 \le x \le 1.2$, $0.8 \le y \le 1.2$, $z=0$),
$Li_x(Fe,Sn)_yP_{1-z}O_4$
($0.8 \le x \le 1.2$, $0.8 \le y \le 1.2$, $z=0$),
$Li_x(Fe,Y)_yP_{1-z}O_4$
($0.8 \le x \le 1.2$, $0.8 \le y \le 1.2$, $z=0$),
$Li_x(Fe,Ni)_yP_{1-z}Si_zO_4$
($0.8 \le x \le 1.2$, $0.8 \le y \le 1.2$, $0 < z \le 0.5$),
$Li_x(Fe,Mn)_yP_{1-z}Si_zO_4$
($0.8 \le x \le 1.2$, $0.8 \le y \le 1.2$, $0 < z \le 0.5$),
$Li_x(Fe,Zr)_yP_{1-z}Si_zO_4$
($0.8 \le x \le 1.2$, $0.8 \le y \le 1.2$, $0 < z \le 0.5$),
$Li_x(Fe,Sn)_yP_{1-z}Si_zO_4$
($0.8 \le x \le 1.2$, $0.8 \le y \le 1.2$, $0 < z \le 0.5$), and
$Li_x(Fe,Y)_yP_{1-z}Si_zO_4$
($0.8 \le x \le 1.2$, $0.8 \le y \le 1.2$, $0 < z \le 0.5$).

When M consists of a plurality of elements, respective atomic % can assume any value within the range of larger than 0 atomic % and less than 100 atomic %, relative to the total amount of M.

From the viewpoint of use as a positive electrode active material, particularly preferred lithium-containing composite oxides are:
$Li_x(Fe,Zr)_yP_{1-z}Si_zO_4$
($0.8 \le x \le 1.2$, $0.8 \le y \le 1.2$, $0 < z \le 0.5$),
$Li_x(Fe,Sn)_yP_{1-z}Si_zO_4$
($0.8 \le x \le 1.2$, $0.8 \le y \le 1.2$, $0 < z \le 0.5$),
$Li_x(Fe,Y)_yP_{1-z}Si_zO_4$
($0.8 \le x \le 1.2$, $0.8 \le y \le 1.2$, $0 < z \le 0.5$),
$Li_x(Fe,Ti)_yP_{1-z}Si_zO_4$
($0.8 \le x \le 1.2$, $0.8 \le y \le 1.2$, $0 < z \le 0.5$),
$Li_x(Fe,Nb)_yP_{1-z}Si_zO_4$
($0.8 \le x \le 1.2$, $0.8 \le y \le 1.2$, $0 < z \le 0.5$), and
$Li_x(Fe,V)_yP_{1-z}Si_zO_4$
($0.8 \le x \le 1.2$, $0.8 \le y \le 1.2$, $0 < z \le 0.5$).

The lithium-containing composite oxide is usually used in the form of particles. The particle size of the primary particle is 1 μm or less, and preferably 10 nm to 1 μm for improving the efficiency of insertion or desorption of lithium ions. The lower limit of the particle size of the primary particle is realistically about 10 nm based on the balance between the efficiency of insertion or desorption and the production cost. The particle size of the primary particle can be measured by direct observation by SEM or by means of a particle size distribution measuring device based on the laser diffraction and scattering method.

(2) Production Method of Lithium-Containing Composite Oxide

The present invention is a method of producing a lithium-containing composite oxide having the olivine structure and represented by the general formula (1), including at least a step of dissolving a source material in a solvent (hereinafter, referred to as a dissolving step), a step of gelating the obtained solution (hereinafter, referred to as a gelating step), a step of grinding the obtained gel to make the average particle size of the gel 0.1 to 50 μm (hereinafter, referred to as a grinding step), and a step of calcinating the obtained gel (hereinafter, referred to as a calcinating step). As is necessary, a step of removing the solvent from the gel obtained in the gelating step (hereinafter, referred to as a drying step), and a step of mixing a substance which is to be a carbon source into the gel before calcinating (hereinafter, referred to as a carbon source mixing step) may be provided.

(i) Dissolving Step

The lithium source, the element M source, the phosphorus source and the element X source which are source materials are not particularly limited as far as they are compounds soluble in a solvent as used. Preferably, these compounds dissolve 10 mmol or more in 100 g of a solvent.

(Lithium Source)

The substance which is to be a lithium source is not particularly limited as far as it is a compound capable of being a raw material for the positive electrode active material of the general formula (1), is soluble in a solvent as used, and not inhibiting the production method of the present invention. Inorganic salts, hydroxides, organic acid salts, and metal alkoxides of lithium, and hydrates of these salts may be used. Specific examples of the inorganic salts include lithium carbonate ($Li_2CO_3$) which is a salt with a weak acid (hereinafter, referred to as a week acid salt), lithium nitrate ($LiNO_3$) and lithium chloride (LiCl) which is a salt with a strong acid (hereinafter, referred to as a strong acid salt). Specific examples of the organic salts include lithium acetate ($LiCH_3COO$) and lithium oxalate ($COOLi)_2$ which are weak acid salts. Specific examples of the metal alkoxides include lithium methoxide ($LiOCH_3$), lithium ethoxide ($LiOC_2H_5$), lithium-n-propoxide ($LiO$-n-$C_3H_7$), lithium-i-propoxide ($LiO$-i-$C_3H_7$), lithium-n-butoxide ($LiO$-n-$C_4H_9$), lithium-t-butoxide ($LiO$-t-$C_4H_9$) and lithium-sec-butoxide ($LiO$-sec-$C_4H_9$). As to the inorganic salts and the organic salts, they may be hydrates. Among these, a weak acid salt or a strong acid salt is preferred from the viewpoints of ease of preparation of a uniform solution under an air and its low cost, and among these, lithium acetate or lithium nitrate is preferred. In the present invention, a "uniform solution" refers to a state that generation of a precipitate is not observed by visual observation, and there is no phase separation into two or more phases.

In the following, a method of dissolving a lithium source will be described in a case where iron and zirconium are used as element M, silicon is used as element X, and ethanol is used as a solvent.

When an anhydride of a weak acid salt is used as a lithium source, it is preferred to dissolve it after dissolution of a hydrate of a salt of an iron source or a hydrate of a salt of a zirconium source because its solubility in ethanol is low. When the lithium source is dissolved before addition of a hydrate of a salt of an iron source or a hydrate of a salt of a zirconium source, it is preferably dissolved in water in advance. Alternatively, water in an amount required for dissolving an anhydride of a weak acid salt may be added in advance to ethanol. The amount of water for dissolving an anhydride of a weak acid salt is preferably 1 to 100 times and more preferably 4 to 20 times the molar number of Li.

An anhydride of a weak acid salt may be dissolved in any combination of an iron source, a zirconium source and a silicon source, in any order to obtain a uniform solution. After allowing a reaction of the obtained uniform solution in advance, the remainder of source materials may be added. It is preferred that the anhydride of a weak acid salt is allowed to react in advance with a hydrate of a salt of an iron source. By allowing the anhydride of a weak acid salt react with a hydrate of a salt of an iron source in advance, it is possible to prevent a precipitate from generating upon addition of phosphoric acid.

Further, it is preferred that the anhydride of a weak acid salt is allowed to react in advance with tetramethoxysilane or tetraethoxysilane, in particular, with tetramethoxysilane. As a preferred procedure of mixing at this time, after dissolving the anhydride of a weak acid salt in water, ethanol is added, and tetramethoxysilane or tetraethoxysilane is added. By heating these to 30° C. to 60° C. after mixing, the reaction will be further promoted. An appropriate heating time without limitation is about 30 minutes to 12 hours. By allowing the anhydride of a weak acid salt react in advance with a silicon source, it is possible to prevent generation of impurities after calcinating and substitution of a Li site for Fe in a lithium composite oxide.

(Element M Source)

The substance which is to be an element M source is not particularly limited insofar as it can be a raw material for the positive electrode active material of the general formula (1), is soluble in a solvent as used, and does not inhibit the production method of the present invention. Inorganic salts, hydroxides, organic acid salts and metal alkoxides of element M, and hydrates of these salts may be used. As described above, M is at least one element selected from the group consisting of Fe, Ni, Mn, Zr, Sn, Al and Y, and preferably includes at least Fe. For example, as an iron source, as inorganic salts, iron (II) carbonate ($Fe(CO_3)$) which is a weak acid salt, iron (II) nitrate ($Fe(NO_3)_2$), iron (III) nitrate ($Fe(NO_3)_3$), iron (II) chloride ($FeCl_2$) and iron (III) chloride ($FeCl_3$) which are strong acid salts can be recited. As organic salts, iron (II) oxalate ($FeC_2O_4$), iron (III) oxalate (III) ($Fe_2(C_2O_4)_3$), iron (II) acetate ($Fe(CH_3COO)_2$) and iron (III) acetate ($Fe(CH_3COO)_3$) which are weak acid salts can be recited. Hydrates of strong acid salts are preferred, and among these, iron (III) nitrate nonahydrate is preferred.

In the following, a dissolving method of an element M source will be described in a case where iron and zirconium are used as element M, silicon is used as element X, and ethanol is used as a solvent.

A hydrate of a strong acid salt may be dissolved in any combination of a lithium source, a zirconium source and a silicon source, in any order to obtain a uniform solution. After allowing the obtained uniform solution react in advance, the remainder of the raw materials may be added. It is preferred that the hydrate of a strong acid salt is added prior to addition of phosphoric acid. Since generation of impurities after calcinating can be prevented by allowing only the hydrate of a strong acid salt react in advance, the hydrate of a strong acid salt may be allowed to react in advance by application of heat to such a degree that a precipitate will not generate after dissolving only the hydrate of a strong acid salt in ethanol.

(Zirconium Source)

As for a zirconium source, as the inorganic salts, zirconium chloride ($ZrCl_4$), zirconium bromide ($ZrBr_4$) and zirconium iodide ($ZrI_4$) which are zirconium halides, and zirconium oxychloride ($ZrOCl_2$) and zirconium oxynitrate ($ZrO(NO_3)_2$) which are oxyzironium salts can be recited. As the metal alkoxides, zirconium methoxide ($Zr(OCH_3)_4$), zirconium ethoxide ($Zr(OC_2H_5)_4$), zirconium-n-propoxide ($Zr(O$-n-$C_3H_7)_4$), zirconium-i-propoxide ($Zr(O$-i-$C_3H_7)_4$), zirconium-n-butoxide ($Zr(O$-n-$C_4H_8)_4$), zirconium-t-butoxide ($Zr(O$-t-$C_4H_8)_4$), zirconium-sec-butoxide ($Zr(O$-sec-$C_4H_8)_4$) and so on are recited. Zirconium halides are preferred, and among these, zirconium chloride is preferred.

The zirconium halide may be dissolved in any combination of a lithium source, an ion source and a silicon source, in any order to obtain a uniform solution. It is preferred that the zirconium halide is allowed to react in advance with an iron source formed of a hydrate of a strong acid salt. By allowing the zirconium halide react in advance with the iron source formed of a hydrate of a strong acid salt, it is possible to prevent impurities such as zirconia or zirconium phosphate from being formed after calcinating. The zirconium halide is preferably allowed to react in advance with tetramethoxysilane or tetraethoxysilane, in particular, with tetramethoxysilane. By allowing the zirconium halide react in advance with a silicon source, it is possible to prevent generation of impurities after calcinating and substitution of a Li site for Fe in a lithium composite oxide.

(Phosphorus Source)

The substance which is to be a phosphorus source is not particularly limited insofar as it can be a raw material for the positive electrode active material of the general formula (1), is soluble in a solvent as used, and does not inhibit the production method of the present invention. Concretely, phosphoric acid ($H_3PO_4$), ammonium hydrogenphosphate (($NH_4$)$_2$$HPO_4$), ammonium dihydrogenphosphate ($NH_4H_2PO_4$) and the like can be recited. Among these, phosphoric acid is preferred.

In the following, a dissolving method of a phosphorus source will be described in a case where iron and zirconium are used as element M, silicon is used as element X, and ethanol is used as a solvent.

Phosphoric acid should be introduced at least after dissolving a lithium source, an iron source and a zirconium source. This is because when phosphoric acid is mixed with an anhydride of a weak acid salt of lithium or with a zirconium halide, a precipitate will be generated. Phosphoric acid may be added in an excess amount. By adding an excess amount of phosphoric acid, it is possible to prevent generation of impurities after calcinating and substitution of a Li site for Fe in a lithium composite oxide. When phosphoric acid is added excessively, it may be added in an excess amount within a range of 5 to 20% by weight, more preferably 5 to 15% by weight, with respect to a stoichiometric ratio of phosphoric acid.

(Element X Source)

The substance which is to be an element X source is not particularly limited insofar as it can be a raw material for the positive electrode active material of the general formula (1), is soluble in a solvent as used, and does not inhibit the production method of the present invention. A metal alkoxide of element X may be used. X is at least one element selected from the group consisting of Si and Al, and is preferably Si. For example, as the silicon source, various silicon alkoxides such as tetraethoxysilane ($Si(OC_2H_5)_4$), tetramethoxysilane ($Si(OCH_3)_4$), methyltriethoxysilane ($CH_3Si(OC_2H_5)_3$), methyltrimethoxysilane ($CH_3Si(OCH_3)_3$), ethylmethoxysilane ($C_2H_5Si(OCH_3)_3$) and ethyltriethoxysilane ($C_2H_5Si(OC_2H_5)_3$) may be recited. Tetraethoxysilane or tetramethoxysilane is preferred.

In the following, a dissolving method of an element X source will be described in a case where iron and zirconium are used as element M, silicon is used as element X, and ethanol is used as a solvent.

A silicon alkoxide may be dissolved in any combination of a lithium source, an iron source and a zirconium source, in any order to obtain a uniform solution. For promoting the reaction of the silicon alkoxide, water may be added. The amount of water added is 1 to 100 times, and more preferably 2 to 20 times the molar number of silicon. By adding water, hydrolysis proceeds and the reaction can be promoted. The silicon alkoxide may be allowed to react in advance with phosphoric acid. When tetraethoxysilane is used, the reaction is conducted preferably at 40° C. to 80° C., and more preferably at 50° C. to 80° C. When tetramethoxysilane is used, the reaction is conducted preferably at 20° C. to 60° C. When tetramethoxysilane is reacted with an anhydride of a weak acid salt which is to be a lithium source, the relationship (molar number of Li of lithium source/molar number of Si of silicon source)≥2 is preferably satisfied.

(Solvent)

As the solvent, water, alcohols, acetone, acetonitrile, tetrahydrofuran, N,N-dimethylformamide, dimethylsulfoxide, acetic acid, formic acid and the like are recited. However, the solvent is not particularly limited insofar as it is a liquid capable of dissolving the aforementioned raw materials, and not inhibiting the production method of the present invention. Among these, alcohols are preferred from the viewpoints of low cost and easy handling.

Examples of the alcohols include, but are not limited to, methanol, ethanol, n-propanol, i-propanol, n-butanol, sec-butanol, t-butanol, ethylene glycol and glycerin, and among these, methanol, ethanol, n-propanol and i-propanol are particularly preferred from the viewpoints of low cost and easy handling.

For dissolving a source material having low solubility in alcohol, a mixed solvent with water may be used as is necessary. The amount of the solvent is not particularly limited insofar as the whole source materials can be dissolved. However, in consideration of the recovery cost of the solvent, the amount of the solvent is within a range of a molar ratio of 1 to 100 times, and more preferably 2 to 15 times the total moles of the whole source materials.

(Dissolving Method)

In a dissolving step, there is sometimes a case that a uniform solution is not obtained due to generation of a precipitate depending on the order of dissolving the source materials. Therefore, the order of dissolving the source materials is important.

In the following, a case where iron and zirconium are used as element M, and silicon is used as element X will be described. As described above, when phosphoric acid is mixed with a lithium source of a weak acid salt, in particular, with a salt anhydride or a zirconium source, a precipitate is generated, and zirconium ions are stabilized owing to the presence of iron ions. Therefore, it is necessary to dissolve a phosphorus source in a solvent in which at least the lithium source, the iron source and the zirconium source are dissolved. The silicon source may be dissolved before dissolving the phosphorus source, or may be dissolved after dissolving the phosphorus source.

In the present invention, the order of dissolving source materials means the order of introducing the source materials when the source materials are sequentially introduced into a solvent, while it means the order of mixing a plurality of solutions when the solutions dissolving the source materials are prepared in advance, and mixed.

The order of preparing a solvent in which a lithium source, an iron source and a zirconium source are dissolved is not particularly limited insofar as a zirconium ion can be stabilized by an iron ion. As a method of stabilizing a zirconium ion by an iron ion, a method of dissolving a zirconium halide after dissolving an anhydride of a strong acid salt of iron in a solvent, a method of dissolving a hydrate of a strong acid salt of iron after dissolving a zirconium halide in a solvent, and a method of simultaneously dissolving a hydrate of a strong acid salt of iron and a zirconium halide in a solvent can be recited. The order of dissolving the iron source and the zirconium source is not particularly limited, and either of them may be dissolved first, or both of them may be dissolved simultaneously.

When a salt anhydride, for example, lithium acetate is used as a lithium source, the salt anhydride will not be dissolved unless water is contained in the solvent. Therefore, when a salt anhydride is used as a lithium source, it is preferred to introduce and dissolve the salt anhydride after dissolving a hydrate of a salt of iron, and a hydrate of a salt of zirconium in the solvent.

In dissolving source materials in a solvent, they may be heated to room temperature or higher. The heating temperature is 30° C. to 80° C., and more preferably 30° C. to 60° C.

While the dissolving step has been described for the exemplary case where iron and zirconium are used as element M, silicon is used as element X, any combination of elements M and X contained in the aforementioned general formula (1) that enables the whole source materials to be uniformly dissolved in a solvent is applicable without limited to the aforementioned exemplary case.

(ii) Gelating Step

In the present step, the solution obtained by the dissolving step is gelated.

The inventors of the present application assume that gelation is achieved in such a way that Li, elements M and P, and element X bind with each other via an oxygen atom to form a group of aggregates, and the aggregates precipitate as fine particles having a particle size of several nanometers to several tens of nanometers in the gel to result in increase in the viscosity of the solution.

For promoting the gelation, it is preferred to add a cyclic ether to the solution. In the gelation method, the solution may be left still or may be stirred.

As the cyclic ether, at least one selected from the group consisting of ethylene oxide, propylene oxide, trimethylene oxide, cis-2,3-epoxybutane, 1,2-epoxybutane, glycidol, epichlorohydrin, epifluorohydrin, epibromohydrin and 3,3-dimethyloxetane may be used. Among these cyclic ethers, propylene oxide is preferred from the viewpoints of production of a uniform gel and low cost. An adding amount of the cyclic ether is preferably 1 to 100 times by molar number relative to the molar number of the entire source materials, although any amount capable of gelating the solution may be employed without limitation. By employing this range, it is possible to disperse individual source materials more uniformly in the gel, and to obtain a raw material of carbon covering the surface of particles. The solution containing the cyclic ether may be heated as is necessary.

(iii) Drying Step

In the present step, the remaining solvent is removed from the gelated gel. As a method of removing the solvent, a method of leaving the gel still at room temperature, a method of heating the gel to 30 to 80° C. to remove the solvent, a method of placing the gel in a chamber using a rotary pump or the like and reducing the pressure to remove the solvent, and so on may be used. The solvent may be removed in a similar manner as described above after conducting solvent exchange with a solvent having higher volatility than the solvent used in preparation of the solution or with a solvent having different surface tension. As a solvent used for the solvent exchange, toluene, benzene, hexane, tetrahydrofuran, isopropanol and mixed solvents thereof can be recited. The solvent may also be removed by extraction by dipping the gel obtained in this step in carbon dioxide in a supercritical state. Preferably, the solvent thus removed is collected and recycled from the industrial viewpoint.

(iv) Grinding Step

The size of secondary particles may be controlled by mechanically grinding the obtained gel. The grinding method is not particularly limited, and methods of heating, cooling and controlling the atmosphere as necessary can be recited.

(v) Carbon Source Mixing Step

Sugars, fats and synthetic resin materials may be mixed with the ground gel. These compounds carbonize at the time of calcinating to form a carbon coating on the surface of the positive electrode material, thereby improving the conductivity of the positive electrode material. The coating with carbon may be applied on the entire surface or partly, however, for obtaining excellent electrode characteristics, the coating is preferably applied uniformly on the entire surface. Here, the term "uniform" means the condition that the thickness of the carbon coating on the positive electrode active material is uniform. This condition can be confirmed with a transmission electron microscope. As the sugars, sucrose, fructose and the like may be used. As the synthetic resin materials, polyethers such as polyethylene glycol and polypropylene glycol, polyvinyl alcohol, polyacrylamide, carboxymethyl cellulose, polyvinyl acetate and the like may be used.

(vi) Calcinating Step

In the present step, by calcinating the obtained gel, a lithium-containing composite oxide is obtained. The calcinating is conducted at a temperature in the range of 400 to 700° C., preferably 400 to 600° C. for 1 to 24 hours. As an atmosphere in the calcinating, an inert atmosphere (atmosphere of argon, nitrogen, vacuum or the like) or a reductive atmosphere (atmosphere of a hydrogen-containing inert gas, carbon monoxide or the like) may be used. For conducting uniform calcinating, the gel may be stirred, and when a toxic gas such as $NO_x$, $SO_x$, or chlorine is generated during the calcinating, a removing device may be provided.

(vii) Other Steps

The obtained lithium-containing composite oxide may be subjected to a grinding step and/or a classifying step as is necessary to have a desired particle size.

(viii) Use Application

The obtained lithium-containing composite oxide may be used as a positive electrode active material for a non-aqueous electrolyte secondary battery. The positive electrode active material may include other oxides such as $LiCoO_2$, $LiNiO_2$, $LiFeO_2$, $LiMnO_2$, $LiMn_2O_4$, $Li_2MnO_3$, $LiCoPO_4$, $LiNiPO_4$, $LiMnPO_4$ and $LiFePO_4$ besides the aforementioned lithium-containing composite oxide.

(II) Non-Aqueous Electrolyte Secondary Battery

A non-aqueous electrolyte secondary battery has a positive electrode, an negative electrode, a non-aqueous electrolyte and a separator. In the following, each constituent material will be described.

(a) Positive Electrode

The positive electrode includes a positive electrode active material, a conductive material, a binder and a collector, and can be fabricated by a known method, for example, by applying a slurry prepared by mixing the active material, the conductive material, the binder and an organic solvent to the collector. When the obtained lithium-containing composite oxide has sufficiently high conductivity, the conductive material does not necessarily have to be added.

As the binder (binding agent), polytetrafluoroethylene, polyvinylidene fluoride, polyvinyl chloride, ethylene propylene diene polymer, styrene-butadiene rubber, acrylonitrile-butadiene rubber, fluorine rubber, polyvinyl acetate, polymethyl methacrylate, polyethylene, nitrocellulose, styrene-butadiene rubber and the like may be used. A thickener such as carboxymethyl cellulose may be used as is necessary.

As the conductive material, acetylene black, carbon, graphite, natural graphite, artificial graphite, needle coke and the like may be used.

As the collector, foamed (porous) metal having interconnected holes, metal formed into a honeycomb structure, sintered metal, expanded metal, nonwoven fabric, plate, foil, perforated plate or foil and the like may be used.

As the organic solvent, N-methyl-2-pyrrolidone, toluene, cyclohexane, dimethylformamide, dimethylacetamide, methylethylketone, methyl acetate, methyl acrylate, diethyltriamine, N—N-dimethylaminopropylamine, ethyleneoxide, tetrahydrofuran and the like may be used. When a water-soluble binder is used, water may be used as a solvent.

The positive electrode preferably has a thickness of about 0.01 to 20 mm. Too large a thickness and too small a thickness are not preferred because the former will deteriorate the conductivity, and the latter will lead to decrease in capacity per unit area. The positive electrode obtained by application and drying may be compressed by a roller press or the like for increasing the packing density of the active material.

(b) Negative Electrode

The negative electrode may be fabricated by a known method. Concretely, it can be fabricated in a manner similar to the method described in the fabricating method of a positive electrode. To be more specific, after mixing a known binding agent and a known conductive material described in the fabricating method of a positive electrode with an negative electrode active material, the mixed powder is formed into a sheet, and the resultant compact is pressure-bonded to a conductor network (collector) of stainless steel, copper or the like. The negative electrode may also be fabricated by applying a slurry obtained by mixing the aforementioned mixed powder with a known organic solvent described in the positive electrode fabricating method, onto a metal substrate of copper or the like.

As the negative electrode active material, a known material may be used. For constructing a battery of high energy density, the potential at which lithium is inserted or desorbed is preferably close to the precipitation or dissolution potential of metal lithium. Typical examples thereof include carbon materials such as particulate (scale-like, massive, fibrous, whisker-like, spherical, ground particulate and so on) natural graphite or artificial graphite.

As the artificial graphite, graphite that is obtained by graphitizing mesocarbon microbeads, mesophase pitch powder, isotropic pitch powder and the like can be recited. Graphite particles including amorphous carbon adhered to its surface may also be used. Among these, natural graphite is more preferred because it is inexpensive, and at a potential close to the oxidation-reduction potential of lithium, and is capable of constructing a battery with high energy density.

Lithium transition metal oxides, lithium transition metal nitrides, transition metal oxides, silicon oxide and the like may also be used as an negative electrode active material. Among these, $Li_4Ti_5O_{12}$ is more preferred because it has highly flat potential, and experiences little change in volume by charging/discharging.

(c) Non-Aqueous Electrolyte

As the non-aqueous electrolyte, for example, an organic electrolytic solution, a gel electrolyte, a polymer solid electrolyte, an inorganic solid electrolyte, a molten salt and the like may be used. After injecting a non-aqueous electrolyte, an opening of a container of a secondary battery is sealed. The generated gas may be removed by electrification prior to the sealing.

As an organic solvent constituting the organic electrolyte, cyclic carbonates such as propylene carbonate (PC), ethylene carbonate (EC) and butylene carbonate, chain carbonates such as dimethyl carbonate (DMC), diethyl carbonate (DEC), ethylmethyl carbonate and dipropyl carbonate, lactones such as γ-butyrolactone (GBL) and γ-valerolactone, furans such as tetrahydrofuran and 2-methyltetrahydrofuran, ethers such as diethylether, 1,2-dimethoxyethane, 1,2-diethoxyethane, ethoxymethoxyethane, and dioxane, dimethylsulfoxide, sulfolane, methylsulfolane, acetonitrile, methyl formate, methyl acetate and the like are recited, and a mixture of at least one kind of these may be used.

Since cyclic carbonates such as PC, EC and butylene carbonate are solvents having a high boiling point, they are suited as a solvent to be mixed with GBL.

As an electrolyte salt constituting the organic electrolytic solution, lithium salts such as lithium borofluoride ($LiBF_4$), lithium hexafluorophosphate ($LiPF_6$), lithium trifluoromethane sulfonate ($LiCF_3SO_3$), lithium trifluoro acetate ($LiCF_3COO$) and lithium bis(trifluoromethanesulfone)imide ($LiN(CF_3SO_2)_2$) can be recited, and a mixture of at least one kind of these may be used. The salt concentration of the electrolytic solution is preferably 0.5 to 3 mol/L.

(d) Separator

As the separator, a porous material, nonwoven fabric and the like are recited. The separator is preferably made of a material that will not be dissolved or swelled in an organic solvent contained in the electrolyte. Specific examples include polyester-based polymers, polyolefin-based polymers (for example, polyethylene and polypropylene), ether-based polymers, and inorganic materials such as glass.

(e) Other Members

As to other members such as a battery container, various materials that are conventionally known for use in a non-aqueous electrolyte secondary battery can be used without any limitation.

(f) Production Method of Non-Aqueous Electrolyte Secondary Battery

A non-aqueous electrolyte secondary battery includes, for example, a laminate made up of a positive electrode, an negative electrode and a separator sandwiched therebetween. The laminate may have, for example, a strip-like planer shape. When a cylindrical or flat battery is fabricated, the laminate may be rolled up.

One laminate or plural laminates is or are inserted into the interior of a battery container. Usually, the positive electrode and the negative electrode are connected to an external conductive terminal of the battery. Thereafter, the battery container is hermetically sealed so as to shield the positive electrode, the negative electrode and the separator against the external air.

As a method of hermetically sealing the container, in the case of a cylindrical battery, generally a lid with a resin packing is fit in an opening of the battery container and the battery container and the lid are caulked. In the case of a square battery, a method of attaching a metallic lid called a sealing plate to the opening, followed by welding may be used. Besides these methods, a method of hermetically sealing the container with a binding material, and a method of fixing with a bolt via a gasket may be used. Further, a method of hermetically sealing the container with a laminate film formed by pasting a thermoplastic resin on a metal foil may also be used. At the time of hermetically sealing the container, an opening for injection of an electrolyte may be provided. In the case of using an organic electrolytic solution, the organic electrolytic solution is injected through the opening, and then the opening is sealed. Prior to sealing, the generated gas may be removed by electrification.

EXAMPLES

In the following, the present invention will be described more specifically based on examples, however, the present invention will not be limited to the following examples. As reagents and the like used in the examples, special grade reagents available from Kishida Chemical Co., Ltd. were used unless otherwise specified.

Example 1

First, in a sample bottle (closed container), 20 g of ethanol as a solvent and 13.125 mmol of $Fe(NO_3)_3 \cdot 9H_2O$ as an iron source were weighed, and the mixture was stirred until the iron source was completely dissolved in the solvent. After confirming that the iron source was completely dissolved, 15 mmol of $LiCH_3COO$ was weighed as a lithium source, 1.875 mmol of $ZrCl_4$ was weighed as a zirconium source and 3.750 mmol of $Si(OC_2H_5)_4$ was weighed as a silicon source, and the mixture was stirred until they were completely dissolved in the solvent and the solution was uniformized. Lastly, 11.250 mmol of $H_3PO_4$ (85%) was weighed as a phosphorus source, and the mixture was stirred until the mixture was uniformized. The molar ratio of the sample was Li:Fe:Zr:P:Si=1:0.875:0.125:0.75:0.25. Thereafter, 3 mL of propylene oxide was added to the solution, and in association with an increase in temperature over about 2 minutes, fluidity was lost and the mixture was gelated.

Next, the sample bottle was brought into a hermetically sealed condition by lidding, and the resultant solution was left still for 24 hours in an air at 40° C. to obtain a gel. The obtained gel was left still for 24 hours in an air at 60° C. to make the solvent evaporate, and then calcinated in a nitrogen atmosphere at a temperature of 600° C. for 12 hours. The obtained sample is named A1. Adhesion of 1.6 parts by weight of carbon with respect to 100 parts by weight of the sample was observed on the surface of the sample.

Example 2

First, in a sample bottle, 20 g of methanol as a solvent and 15 mmol of $Fe(NO_3)_3 \cdot 9H_2O$ as an iron source were weighed, and the mixture was stirred until the iron source was completely dissolved in the solvent. After confirming that the iron source was completely dissolved, 15 mmol of $LiCH_3COO$ was weighed as a lithium source, and the mixture was stirred until the lithium source was completely dissolved and the solution was uniformized. Thereafter, 15 mmol of $H_3PO_4$ (85%) was weighed as a phosphorus source, and the mixture was stirred until the phosphorus source was completely dissolved and the solution was uniformized. The molar ratio of the sample was Li:Fe:P=1:1:1. Thereafter, 3 mL of propylene oxide (carbon source) was added to the solution, and in association with an increase in temperature over about 1 minute, fluidity was lost and the mixture was gelated.

Next, the sample bottle was brought into a hermetically sealed condition by lidding, and the resultant solution was left still for 24 hours in an air at 40° C. to obtain a gel. The obtained gel was left still for 24 hours in an air at 60° C. to make the solvent evaporate, and then calcinated in a nitrogen atmosphere at a temperature of 600° C. for 12 hours. The obtained sample is named A2. Adhesion of 2.4 parts by weight of carbon with respect to 100 parts by weight of the sample was observed on the surface of the sample.

Example 3

First, in a sample bottle, 20 g of ethanol as a solvent and 11.250 mmol of $Fe(NO_3)_3 \cdot 9H_2O$ as an iron source were weighed, and the mixture was stirred until the iron source was completely dissolved in the solvent. After confirming that the iron source was completely dissolved, 15 mmol of $LiCH_3COO$ was weighed as a lithium source, 3.750 mmol of $ZrCl_4$ was weighed as a zirconium source and 7.500 mmol of $Si(OCH_3)_4$ was weighed as a silicon source, and the mixture was stirred until they were completely dissolved in the solvent and the solution was uniformized. Thereafter, 7.500 mmol of $H_3PO_4$ (85%) was weighed as a phosphorus source, and the mixture was stirred until the phosphorus source was completely dissolved and the solution was uniformized. The molar ratio of the sample was Li:Fe:Zr:P:Si=1:0.75:0.25:0.5:0.5. Thereafter, 4 mL of propylene oxide (carbon source) was added to the solution, and in association with an increase in temperature over about 1 minute, fluidity was lost and the mixture was gelated.

Next, the sample bottle was brought into a hermetically sealed condition by lidding, and the resultant solution was left still for 24 hours in an air at 40° C. to obtain a gel. The obtained gel was left still for 24 hours in an air at 60° C. to make the solvent evaporate, and after mixing the ground gel and sucrose (carbon source) dissolved in water in a weight ratio of 1:0.1, followed by drying, calcinating in a nitrogen atmosphere at a temperature of 600° C. for 12 hours was conducted. The obtained sample is named A3. Adhesion of 3.4 parts by weight of carbon with respect to 100 parts by weight of the sample was observed on the surface of the sample.

Example 4

First, in a sample bottle, 20 g of ethanol as a solvent and 13.500 mmol of $Fe(NO_3)_3 \cdot 9H_2O$ as an iron source were weighed, and the mixture was stirred until the iron source was completely dissolved in the solvent. After confirming that the iron source was completely dissolved, 15 mmol of $LiCH_3COO$ was weighed as a lithium source, 1.500 mmol of $ZrCl_4$ was weighed as a zirconium source and 3.000 mmol of $Si(OC_2H_5)_4$ was weighed as a silicon source, and the mixture was stirred until they were completely dissolved in the solvent and the solution was uniformized. Thereafter, 1 mL of polyethylene glycol 200 (carbon source) was added to the solution, and the mixture was stirred for 30 minutes, and lastly, 12.000 mmol of $H_3PO_4$ (85%) was weighed as a phosphorus source, and the mixture was stirred until they were uniformized. The molar ratio of the sample was Li:Fe:Zr:P:Si=0.9:0.1:0.8:0.2. 3 mL of propylene oxide (carbon source) was added to the solution and the mixture was stirred for about 30 mL to make the solution gelate.

Next, the sample bottle was brought into a hermetically sealed condition by lidding, and the resultant solution was left still for 24 hours in an air at 40° C. to obtain a gel. The obtained gel was left still for 24 hours in an air at 60° C. to make the solvent evaporate, and then calcinated in a nitrogen atmosphere at 600° C. for 12 hours. The obtained sample is named A4. Adhesion of 4.5 parts by weight of carbon with respect to 100 parts by weight of the sample was observed on the surface of the sample.

Example 5

First, in a sample bottle, 26 g of isopropanol as a solvent and 12.000 mmol of $Fe(NO_3)_3 \cdot 9H_2O$ as an iron source were weighed, and the mixture was stirred until the iron source was completely dissolved in the solvent. After confirming that the iron source was completely dissolved, 15 mmol of $LiNO_3$ was weighed as a lithium source, 3.000 mmol of $ZrCl_4$ was weighed as a zirconium source and 9.000 mmol of $Si(OC_2H_5)_4$ was weighed as a silicon source, and the mixture was stirred until they were completely dissolved in the solvent and the solution was uniformized. Thereafter, 9.000 mmol of $H_3PO_4$ (85%) was weighed as a phosphorus source, and the mixture was stirred until the phosphorus source was completely dissolved and the solution was uniformized. The molar ratio of the sample was Li:Fe:Zr:P:Si=1:0.8:0.2:0.6:0.4. Thereafter, 3 mL of propylene oxide (carbon source) was added to the solution, and in association with an increase in temperature over about 2 minutes, fluidity was lost and the mixture was gelated.

Next, the sample bottle was brought into a hermetically sealed condition by lidding, and the resultant solution was left still for 24 hours in an air at 40° C. to obtain a brown gel. The obtained gel was left still for 24 hours in an air at 60° C. to make the solvent evaporate, and then calcinated in a nitrogen atmosphere at a temperature of 600° C. for 12 hours. The obtained sample is named A5. Adhesion of 1.8 parts by weight of carbon with respect to 100 parts by weight of the sample was observed on the surface of the sample.

Example 6

As starting materials, lithium acetate as a lithium source, iron (III) nitrate as an iron source and phosphoric acid as a phosphorus source were weighed in a molar ratio of Li:Fe:P=1:1:1. The weighed starting materials were dissolved in ethanol of 26.67 times the Li by molar ratio. Propylene oxide in an equivalent molar amount to that of ethanol was added to the ethanol solution dissolving the starting materials, and in association with an increase in temperature over about 30 seconds, fluidity was lost and the mixture was gelated. The solution after addition was put in a container and the container was lidded, and the solution was left still overnight in a drying oven at 60° C., and dried over another night in the condition that the lid was open, to obtain a gel. The obtained gel was calcinated in an inert atmosphere (concretely, nitrogen atmosphere) at 550° C. for 12 hours, to obtain a lithium-containing composite oxide ($LiFePO_4$) coated with carbon which is a positive electrode active material composed of olivine-type single-phase powder (particle size 10 μm). The obtained sample is named A6. Adhesion of 6.2 parts by weight of carbon with respect to 100 parts by weight of the sample was observed on the surface of the sample.

Comparative Example 1

In an agate mortar, 15 mmol of lithium carbonate ($Li_2CO_3$) as a lithium source, 13.125 mmol of iron oxalate dihydrate ($FeC_2O_4 \cdot 2H_2O$) as an iron source, 1.875 mmol of zirconium oxychloride ($ZrOCl_2$) as a zirconium source, 11.250 mmol of ammonium hydrogenphosphate (($NH_4)_2HPO_4$) as a phosphorus source and 3.750 mmol of $SiO_2$ powder as a silicon source were weighed, and ground until they were uniformized. The molar ratio of the sample was Li:Fe:Zr:P:Si=1:0.875:0.125:0.75:0.25. Further, 10% by weight of sucrose (carbon source), with respect to the weight of $LiFe_{0.875}Zr_{0.125}P_{0.750}Si_{0.250}O_4$ which is expected to be generated, was added, and the materials were mixed and ground until they were uniformized.

Then the obtained powder was calcinated in a nitrogen atmosphere at 600° C. for 12 hours. The obtained sample is named B1. Adhesion of 2.3 parts by weight of carbon with respect to 100 parts by weight of the sample was observed on the surface of the sample.
(Composition of Positive Electrode Active Material)

Each of the obtained samples A1 to A6 and B1 was ground in an agate mortar, and powder X-ray diffraction patterns were obtained respectively as shown in FIGS. 1 to 7 with a powder X-ray analyzer (available from Rigaku Corporation, Model: MiniFlex II). The measuring condition was a FT mode in which the range of 2θ was 10° to 90°, one step was 0.02°, and the measuring time per one step was 3 s.

Next, a structural analysis was conducted for the obtained powder X-ray diffraction patterns using "RIETAN-2000" (F. Izumi AND T. Ikeda, Mater. Sci. Forum, 321-324 (2000) 198-203) and generation of a positive electrode active material having a composition expected to be generated was confirmed.
(Evaluation of Secondary Battery)

Secondary batteries were created for the obtained samples in the following manner.

About 1 g of each of the samples A1 to A6 and B1 was weighed, and ground in an agate mortar, and mixed with about 10% by weight of acetylene back as a conductive agent, and about 10% by weight of Teflon resin powder as a binding agent.

The resultant mixture was dissolved in N-methyl-2-pyrrolidone to make it into a slurry, and the slurry was applied on both faces of an aluminum foil of 20 μm thick by a doctor blade technique. The applying amount was about 5 mg/cm$^2$. After drying this coating film, pressing was conducted to fabricate a positive electrode.

As a negative electrode active material, natural graphite powder or lithium titanate ($Li_4Ti_5O_{12}$) was used. To the negative electrode active material was added about 10% by weight of Teflon resin powder as a binding agent. When lithium titanate was used as an negative electrode active material, about 10% by weight of acetylene back was further mixed as a conductive agent. The resultant mixture was dissolved in N-methyl-2-pyrrolidone to make it into a slurry, and the slurry was applied on both faces of a copper foil of 20 μm thick, dried, and then pressed to fabricate an negative electrode.

Each of the positive electrode and the negative electrode fabricated in the manner as described above was cut out into a size of 30 mm×30 mm, and as a current introducing terminal of the battery, an aluminum tab of 3 mm wide and 50 mm long was welded to the positive electrode, and a copper tab of 3 mm wide and 50 mm long was welded to the negative electrode.

A separator made of porous polyethylene was sandwiched between the positive electrode and the negative electrode. The obtained laminate was sandwiched between two laminate films serving as a battery exterior formed by pasting a thermoplastic resin on a metal foil, and hermetically sealed by thermally welding the periphery. This laminate is provided with an opening for injection of an electrolyte.

Figure 1:
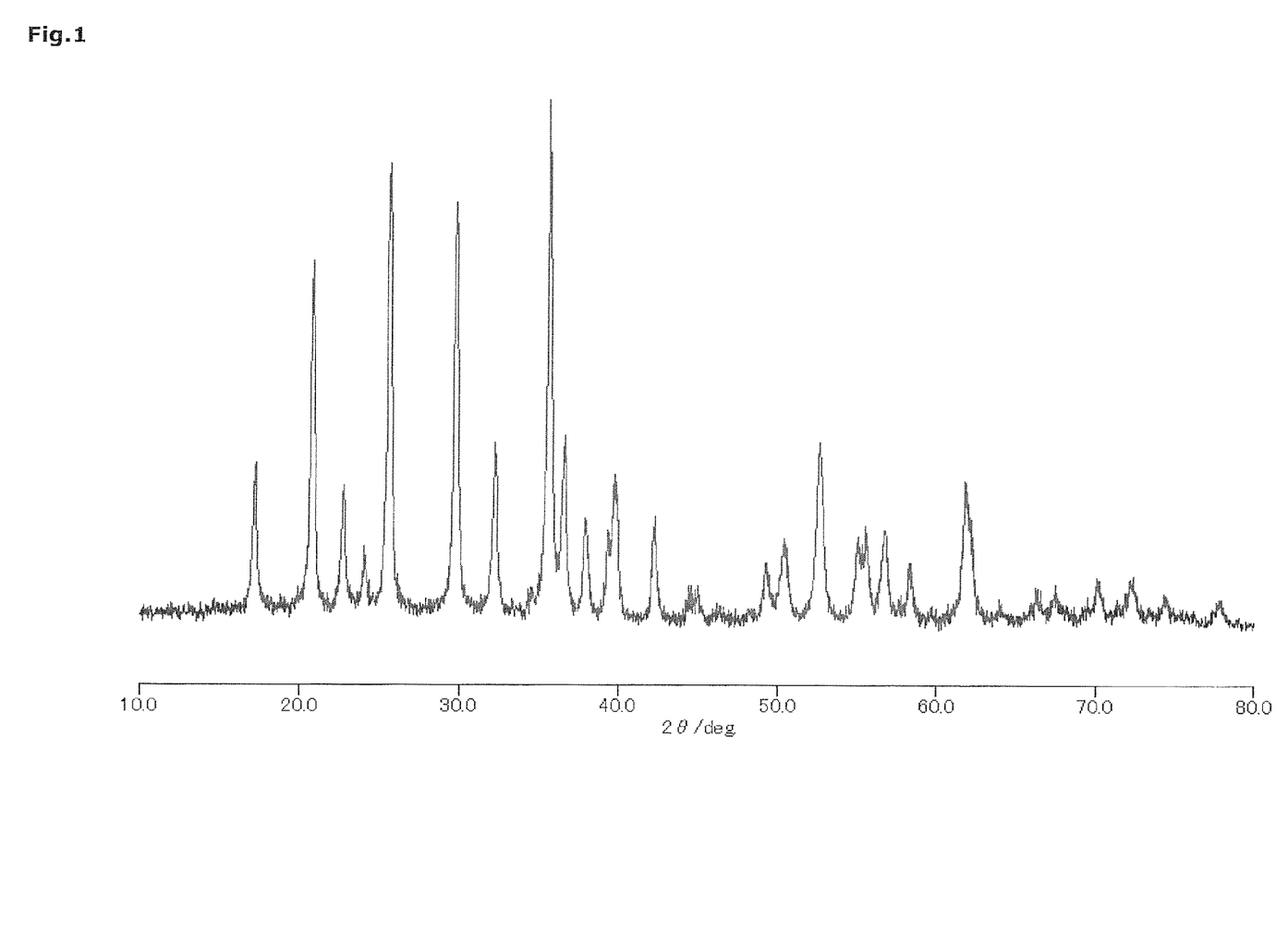
FIG. 1 is a powder X-ray diffraction pattern of a positive electrode active material of Example 1 in accordance with the present invention.
Figure 2:
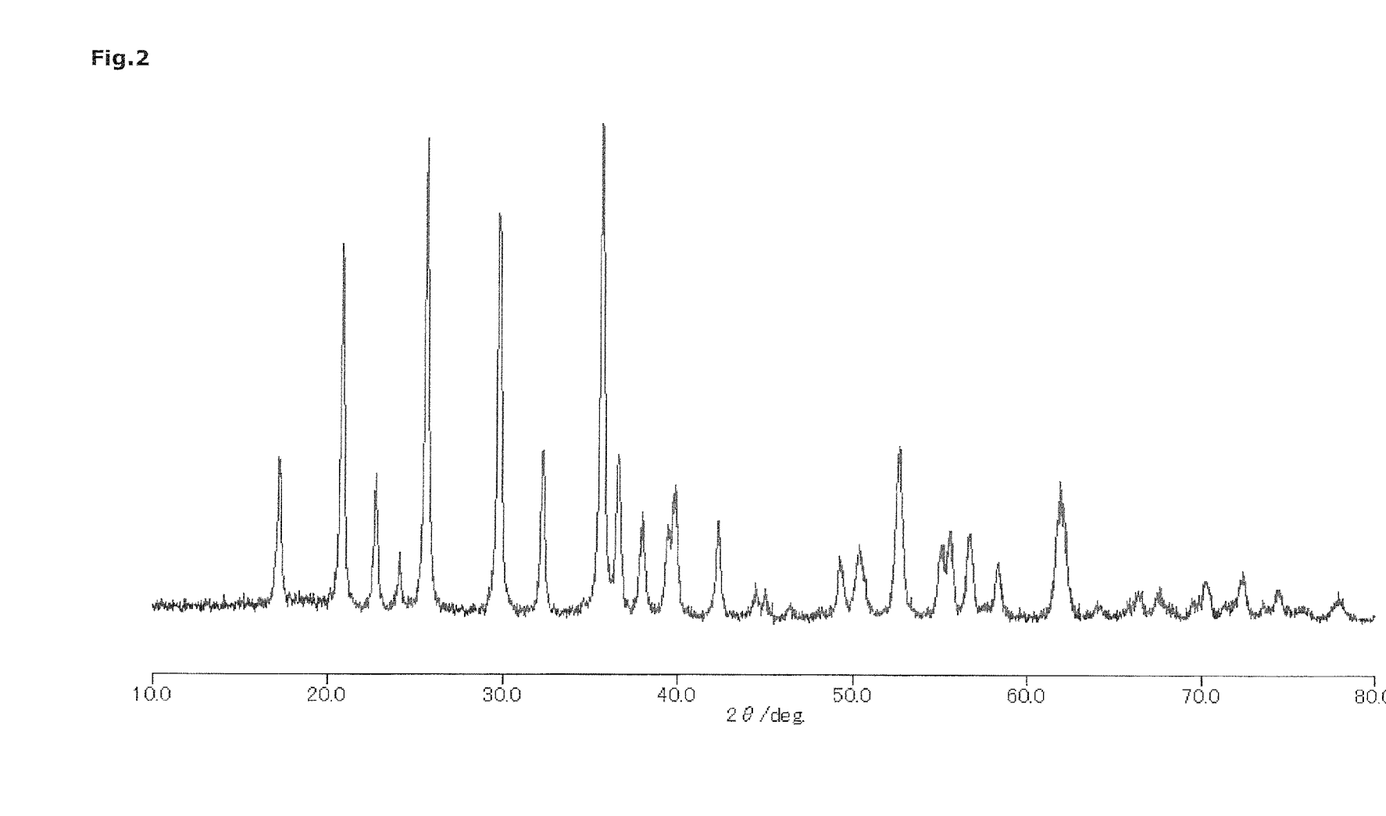
FIG. 2 is a powder X-ray diffraction pattern of a positive electrode active material of Example 2 in accordance with the present invention.
Figure 3:
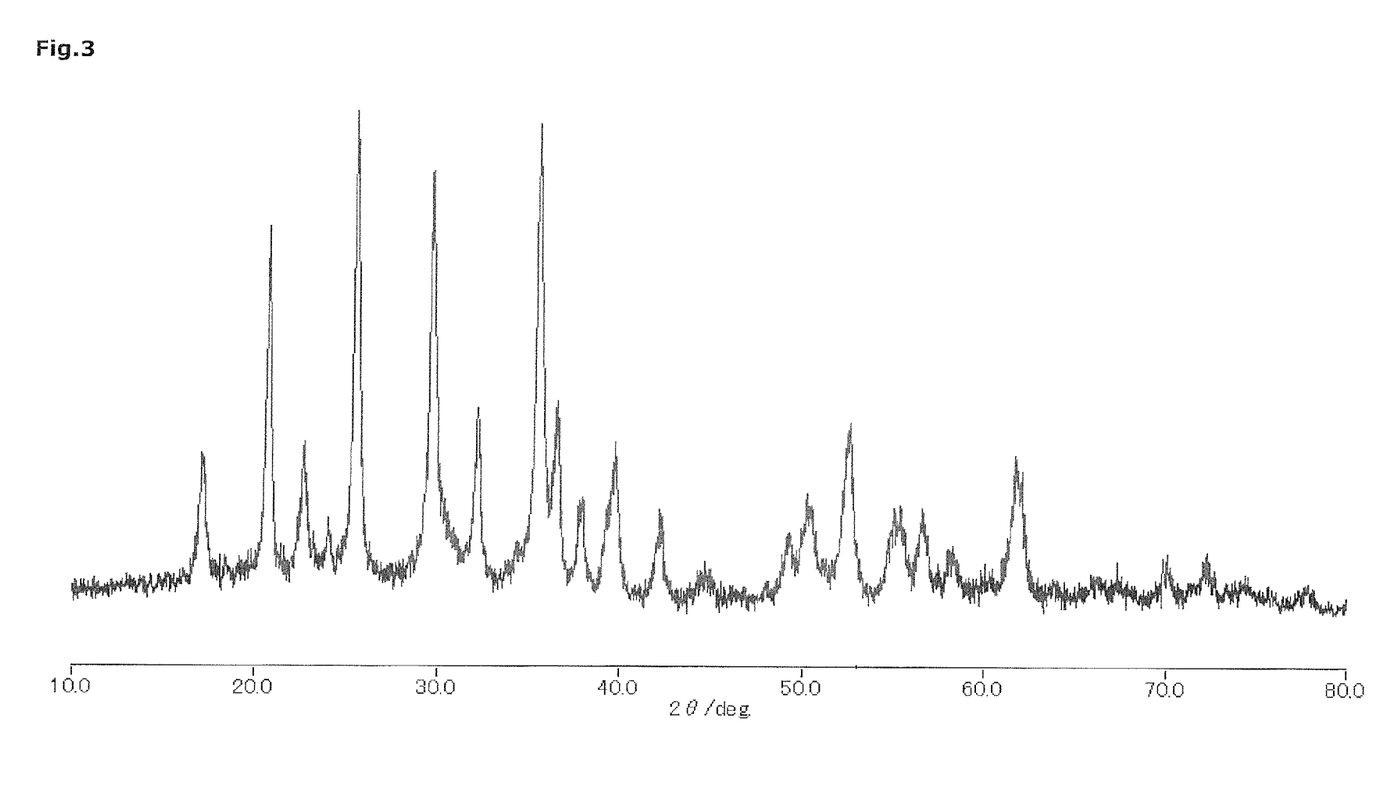
FIG. 3 is a powder X-ray diffraction pattern of a positive electrode active material of Example 3 in accordance with the present invention.
Figure 4:
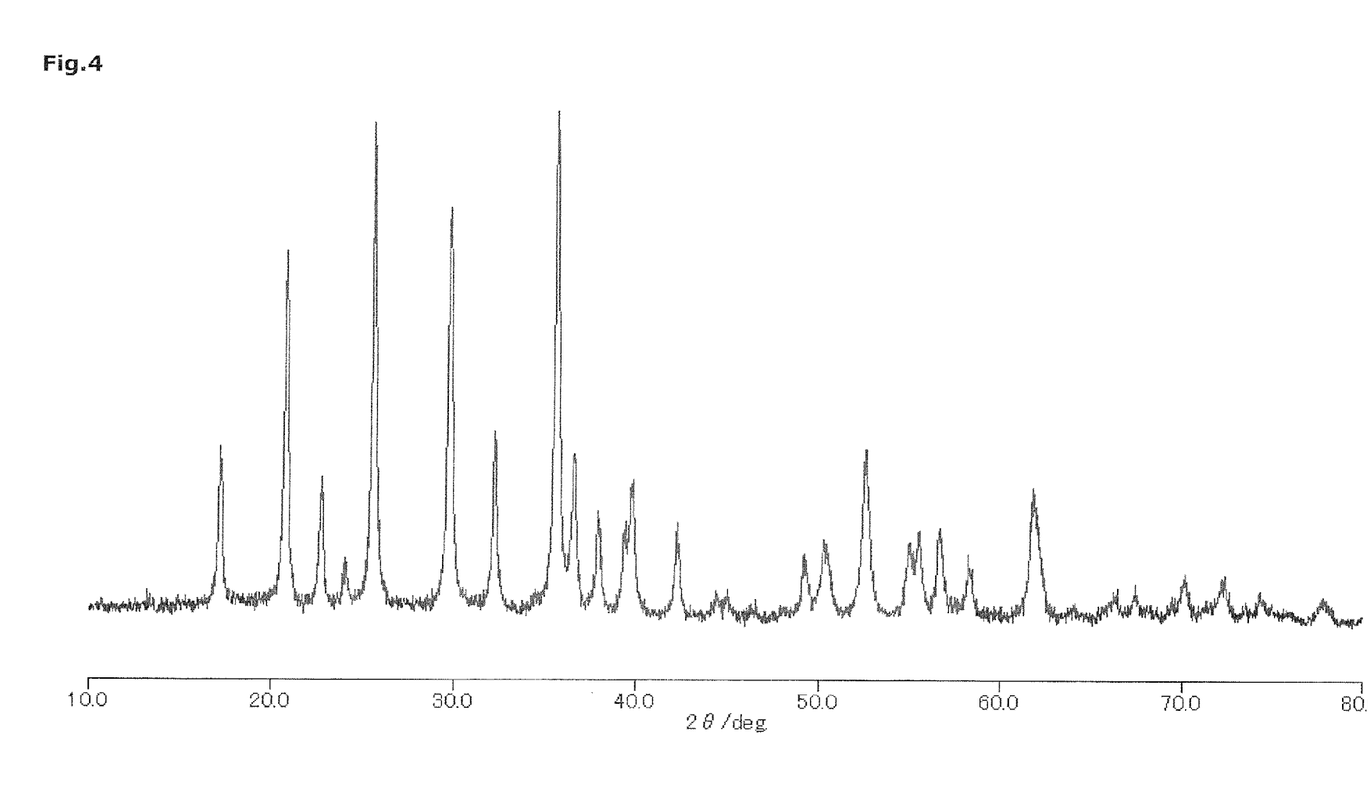
FIG. 4 is a powder X-ray diffraction pattern of a positive electrode active material of Example 4 in accordance with the present invention.
Figure 5:
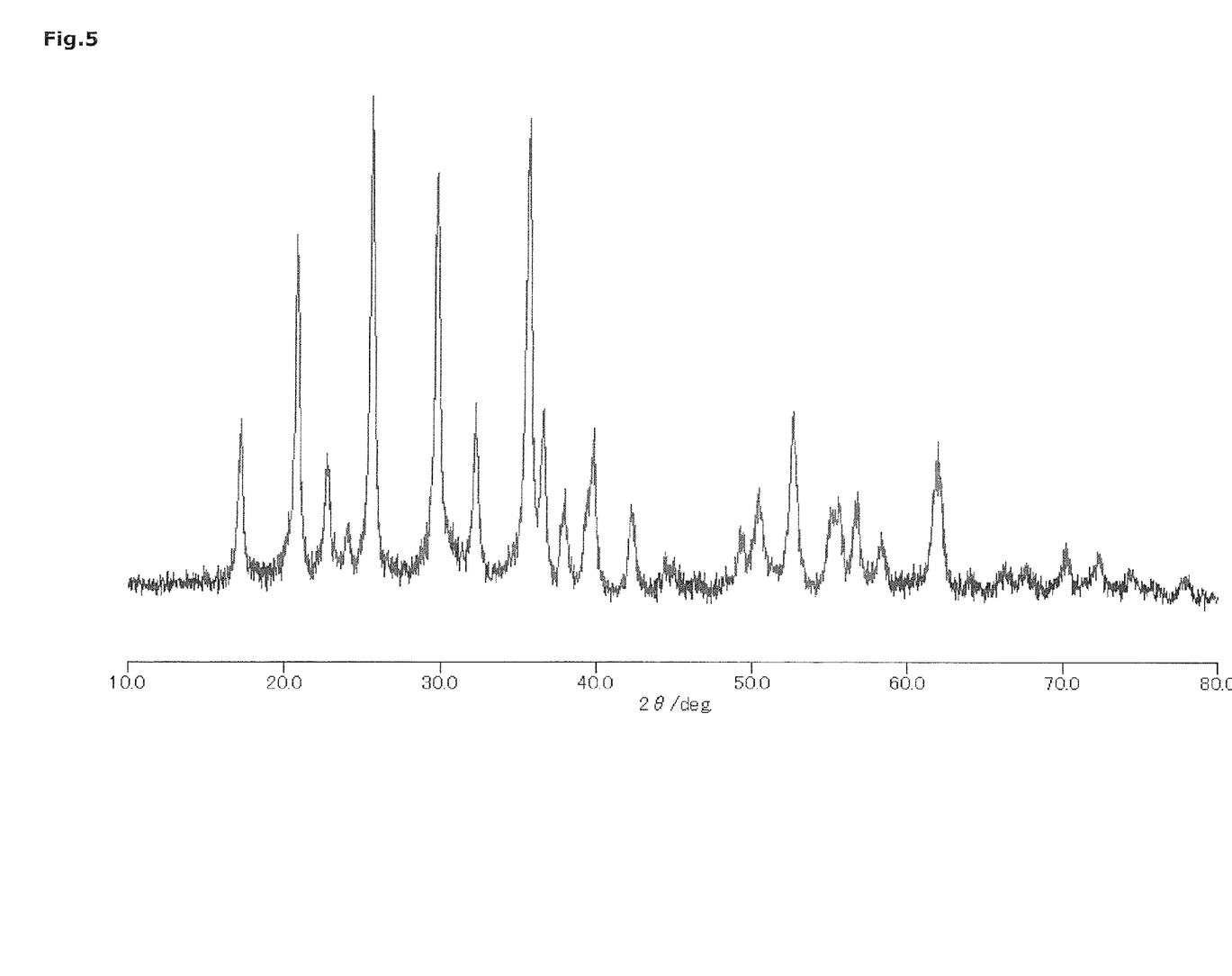
FIG. 5 is a powder X-ray diffraction pattern of a positive electrode active material of Example 5 in accordance with the present invention.
Figure 6:
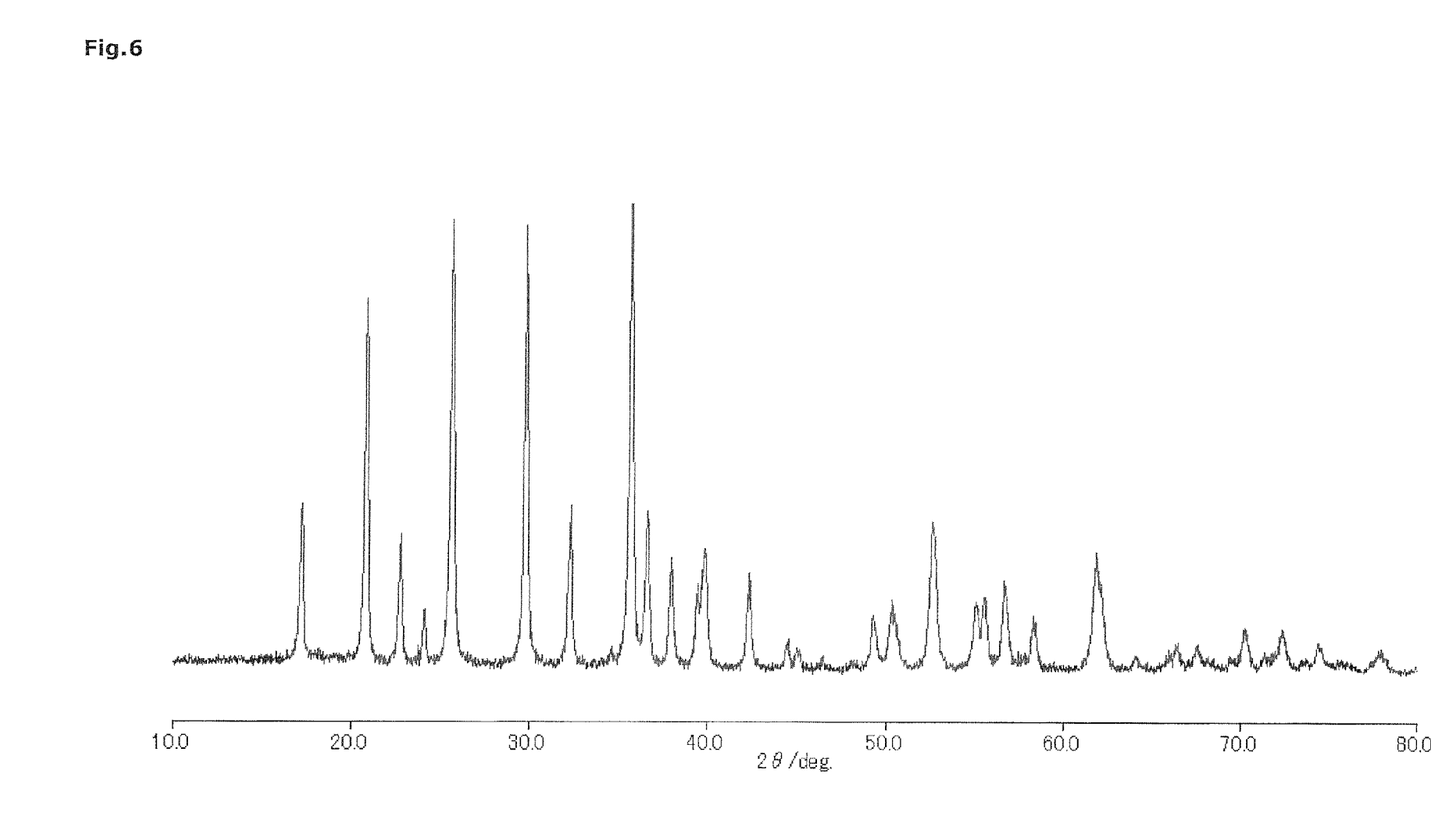
FIG. 6 is a powder X-ray diffraction pattern of a positive electrode active material of Example 6 in accordance with the present invention.
Figure 7:
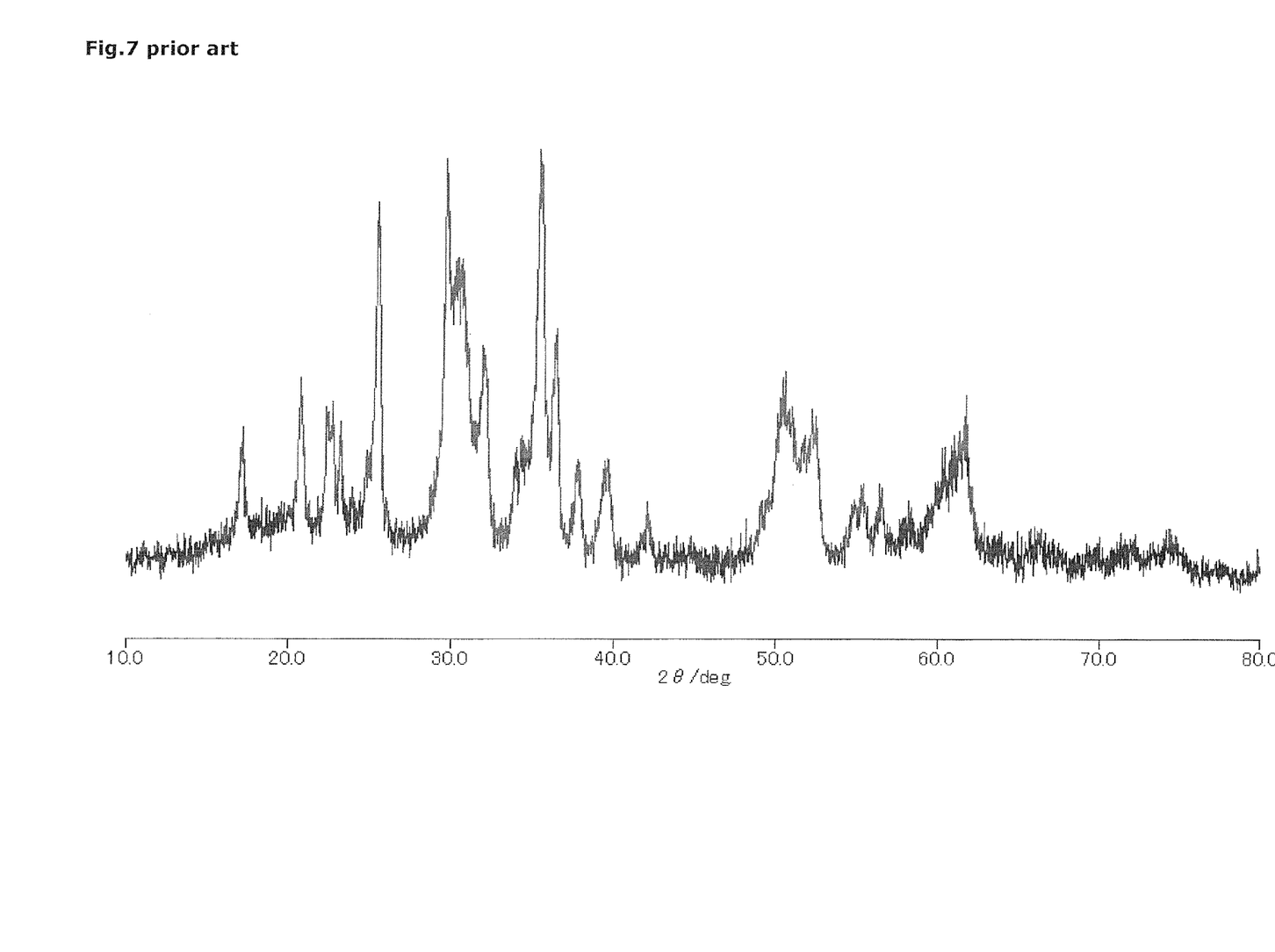
FIG. 7 is a powder X-ray diffraction pattern of a positive electrode active material of Comparative Example 1.
Figure 8:
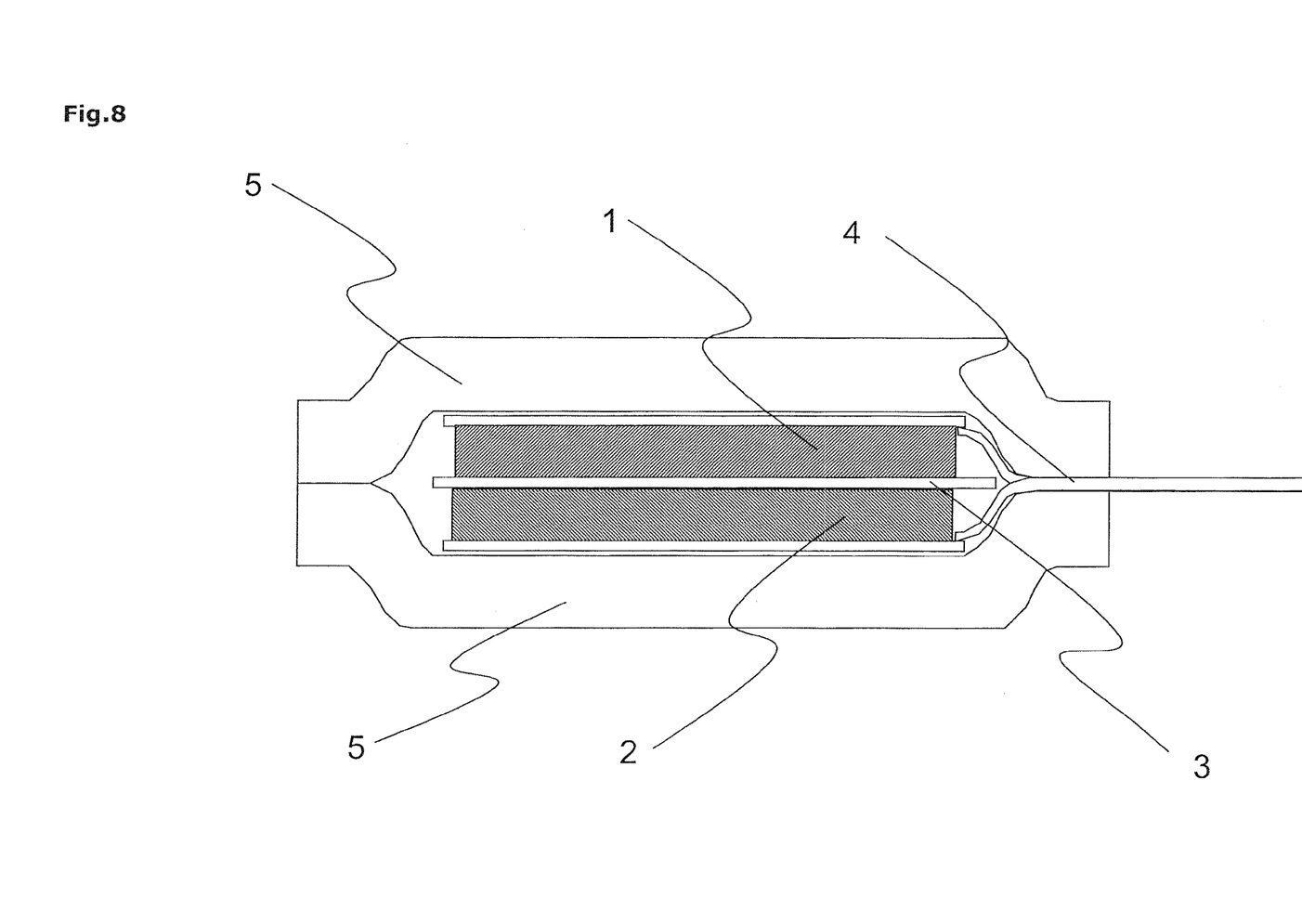
FIG. 8 is a schematic section view of a secondary battery.

An opening was impregnated with 33% by volume of ethylene carbonate dissolving 1 mol/L of $LiPF_6$ and 67% by volume of diethyl carbonate as electrolytes. Then the opening was sealed, to obtain a secondary battery as shown in FIG. 8. FIG. 8 is a schematic section view of a secondary battery. In FIG. 8, the secondary battery includes a positive electrode 1, an negative electrode 2, a separator 3, a positive electrode and negative electrode tab 4, and a laminate 5.

The battery fabricated in this manner was charged and discharged in an environment at 25° C. The charging current was 1 mA, and charging was ended at the point where the potential of the battery reached 4 V. After end of the charging, discharging at 1 mA was started, and the discharging was ended at the point where the potential of the battery reached 2.0 V. Charging/discharging at a current of 1 mA was further repeated, and the discharge capacity at the 100th time was measured, and a capacity retention rate (%) was determined according to the following formula:

Capacity retention rate=Discharge capacity at 100th time/Discharge capacity at first time Table 1 show the obtained result together with the raw materials and the production condition of the positive electrode active material.

TABLE 1

|  |  | Ex. 1 | Ex. 2 | Ex. 3 | Ex. 4 |
|---|---|---|---|---|---|
| Sample |  | A1 | A2 | A3 | A4 |
| Production Method |  | sol-gel method | | | |
| Raw material of PEAM* represented following formula$_X$ | Li source/mole ratio | LiCH3COO/1.000 | LiCH3COO/1.000 | LiCH3COO/1.000 | LiCH3COO/1.000 |
|  | Fe source/1 − x | Fe(NO3)•9H2O/0.875 | Fe(NO3)•9H2O/1.000 | Fe(NO3)•9H2O/0.750 | Fe(NO3)•9H2O/0.900 |
|  | M source/x | ZrCl4/0.125 | — | ZrCl4/0.250 | ZrCl4/0.100 |
|  | P source/1 − y | H3PO4/0.750 | H3PO4/1.000 | H3PO4/0.500 | H3PO4/0.800 |
|  | S source/y | Si(OC2H5)4/0.250 | — | Si(OCH3)4/0.500 | Si(OC2H5)4/0.200 |
| Carbon source | Material | propylene oxide | propylene oxide | propylene oxide + sucrose | propylene oxide + polyethylene glycol |
|  | wt % to production prediction amount of PEAM | 99.1 | 101.4 | 178.7 | 146 |
| solvent | Material | ethanol | methanol | ethanol | ethanol |
|  | solute/solvent(mole ratio) | 0.0345 | 0.024 | 0.0345 | 0.0345 |
| Leaving condition | Atmosphere/Temp.(° C.)/Time(hr) | air/40/24 | | | |
| evaporation | Atmosphere/Temp.(° C.)/Time(hr) | air/60/24 | | | |
| calcinations | Atmosphere/Temp.(° C.)/Time(hr) | nitrogen/600/12 | | | |
| Carbon adhesion amount(to 100 pbw of sample) |  | 1.6 | 2.4 | 3.4 | 4.5 |
| Evaluation | Discharge capacity at first time(mAh/g) | 117.4 | 137.5 | 98.7 | 120.9 |
|  | Discharge capacity at 100 times(mAh/g) | 114.9 | 122.8 | 96.9 | 114.4 |
|  | Capacity retention rate(%) | 97.9 | 89.3 | 98.2 | 94.6 |

|  |  | Ex. 5 | Ex. 6 | Com. Ex. 1 |
|---|---|---|---|---|
| Sample |  | A5 | A6 | B1 |
| Production Method |  | sol-gel method | | solid-phase method |
| Raw material of PEAM* represented following formula$_X$ | Li source/mole ratio | LiNO3/1.000 | LiCH3COO/1.000 | Li2CO3/1.000 |
|  | Fe source/1 − x | Fe(NO3)•9H2O/0.800 | Fe(NO3)•9H2O/1.000 | FeC2O4•2H2O/0.875 |
|  | M source/x | ZrCl4/2.000 | — | ZrOCl2/0.125 |
|  | P source/1 − y | H3PO4/0.600 | H3PO4/1.000 | (NH4)2HPO4/0.750 |
|  | S source/y | Si(OC2H5)4/0.400 | — | SiO2/0.250 |
| Carbon source | Material | propylene oxide | propylene oxide | sucrose |
|  | wt % to production prediction amount of PEAM | 97.8 | 983 | 10 |
| solvent | Material | isopropanol | ethanol | — |
|  | solute/solvent(mole ratio) | 0.0345 | 0.037 | — |
| Leaving condition | Atmosphere/Temp.(° C.)/Time(hr) | air/40/24 | air/60/24 | — |
| evaporation | Atmosphere/Temp.(° C.)/Time(hr) | air/60/24 | air/60/24 | — |
| calcinations | Atmosphere/Temp.(° C.)/Time(hr) | nitrogen/600/12 | nitrogen/550/12 | nitrogen/600/12 |
| Carbon adhesion amount(to 100 pbw of sample) |  | 1.8 | 6.2 | 2.3 |
| Evaluation | Discharge capacity at first time(mAh/g) | 112.6 | 143.7 | 16.3 |
|  | Discharge capacity at 100 times(mAh/g) | 110.4 | 130.2 | 2.3 |
|  | Capacity retention rate(%) | 98.0 | 90.6 | 14.1 |

$_X$LiFe1−xMxP1−ySiyO
*PEAM: positive electrode active material

The results of Table 1 revealed that the non-aqueous electrolyte secondary batteries using the samples A1 to A6, obtained by the production method of the present invention, as a positive electrode active material showed the discharge capacity at first time and the discharge capacity at 100th time of generally 100 mAh/g or more, and a capacity retention rate of generally 90% or higher, and had excellent cycle characteristics.

On the other hand, it was revealed that the non-aqueous electrolyte secondary battery using the sample B1 having a different composition as a positive electrode active material was inferior to the aforementioned non-aqueous electrolyte secondary batteries in the discharge capacity at first time, the discharge capacity at 100th time, and the capacity retention rate.

According to the present invention, since the material elements can be dispersed uniformly in a gel, it is possible to produce a lithium-containing composite oxide having a single-phase olivine structure while preventing generation of impurities. In addition, since the concentration of the elements per unit volume of the gel is low in comparison with the case of a solid-phase method, particles are less likely to grow at the time of calcinating. Furthermore, by grinding the gel, it is possible to reduce the contact area between the ground products of the gel and to prevent the particles from growing. As a result, it becomes possible to prevent the primary particles and the secondary particles from aggregating, and particle diameters thereof can be controlled without grinding the lithium-containing composite oxide after calcinating, so that crystallinity of the lithium-containing composite oxide will not be deteriorated. As a result, according to the present invention, it is possible to provide a positive electrode active material for use in a lithium secondary battery that is excellent in safety and cost, and allows extended service life of the battery.

What is claimed is:
1. A method of producing a positive electrode active material, comprising the steps of:
 preparing a solution by dissolving, in a solvent, respective predetermined amounts of a lithium source, a M source, a phosphorus source and a X source necessary for form- ing a positive electrode active material represented by the following general formula (1) and having an olivine structure;

increasing a viscosity of the obtained solution by adding a cyclic ether so as to generate a gel; and calcinating the generated gel to obtain a carbon-coated lithium-containing composite oxide, wherein the cyclic ether is used as a carbon source;

wherein the positive electrode active material is represented by the general formula (1):

$$Li_xM_yP_{1-z}X_zO_4 \quad (1)$$

wherein M is Fe and Zr, X is at least one selected from the group consisting of Si and Al, and $0.8 \leq x \leq 1.2$, $0.8 \leq y \leq 1.2$, $0 \leq z \leq 0.5$.

2. The method of producing a positive electrode active material according to claim 1, wherein the cyclic ether includes in its structure an epoxy group or an oxetane ring.

3. The method of producing a positive electrode active material according to claim 1, wherein M in the general formula (1) is Fe and Zr, and X is Si.

4. The method of producing a positive electrode active material according to claim 1, wherein the lithium source is lithium acetate or lithium nitrate, the M source is iron nitrate nonahydrate or zirconium chloride, the phosphorus source is phosphoric acid, and the silicon source is tetraethoxysilane or tetramethoxysilane.

5. The method of producing a positive electrode active material according to claim 1, wherein the solvent is an alcohol solvent.

6. The method of producing a positive electrode active material according to claim 5, wherein the alcohol solvent is methanol, ethanol or propanol.

7. The method of producing a positive electrode active material according to claim 1, wherein the step of subjecting the generated gel to a calcinating treatment includes drying the gel in advance by retention in an air at a temperature of 40 to 70° C. for 1 to 72 hours, and retaining the gel in a reductive atmosphere at a temperature of 400 to 800° C. for 1 to 48 hours.

8. The method of producing a positive electrode active material according to claim 1,
wherein the M source comprises (i) a zirconium source selected from the group consisting of zirconium halides and (ii) an iron source selected from the group consisting of hydrates of strong acid salts,
wherein the X source comprises a silicon source,
the method further comprising allowing the zirconium source to react with the iron source or the silicon source prior to the step of calcinating the generated gel.

9. The method of producing a positive electrode active material according to claim 1,
wherein the M source comprises an iron source,
wherein the X source comprises a silicon source,
wherein the lithium source is chosen from the group consisting of anhydrides of weak acid salts,
the method further comprising allowing the lithium source to react with the iron source or the silicon source prior to the step of calcinating the generated gel.

10. The method of producing a positive electrode active material according to claim 8,
wherein the lithium source is chosen from the group consisting of anhydrides of weak acid salts,
the method further comprising allowing the lithium source to react with the iron source or the silicon source prior to the step of calcinating the generated gel.

* * * * *